United States Patent [19]
Ziener et al.

[11] 3,821,028
[45] June 28, 1974

[54] FUEL CELL WITH METAL CHELATE ELECTRODE CATALYST

[75] Inventors: Hermann Ziener, Moglingen; Lothar Weber, Gerlingen-Schillerhohe; Horst Jahnke, Gerlingen; Horst Magenau, Stuttgart; Georg Zimmermann, Gerlingen, all of Germany

[73] Assignee: Robert Bosch GmbH, Stuttgart, Germany

[22] Filed: June 7, 1972

[21] Appl. No.: 260,391

[30] Foreign Application Priority Data
June 11, 1971 Germany.......................... 2128842

[52] U.S. Cl. ........................ 136/86 D, 136/120 FC
[51] Int. Cl. ....................................... H01m 27/04
[58] Field of Search........... 136/86 D, 86 R, 120 FC

[56] References Cited
OTHER PUBLICATIONS
Liebigs Ann Chem 717, 137–147 (1968) (Pages 137–143 cited)

Primary Examiner—A. B. Curtis
Assistant Examiner—H. A. Feeley
Attorney, Agent, or Firm—Michael S. Striker

[57] ABSTRACT

A catalyst for fuel cell electrodes wherein a gaseous fuel or a fuel dissolved in the electrolyte of the cell is subjected to anodic oxidation, comprises a metal chelate of 5, 14-dihydro-dibenzo(5,9,14,18) tetraaza(14)-annulene or an electrochemical oxidation product thereof.

The catalyst permits formation of electrodes which can be operated with an acidic electrolyte and comparatively inexpensive fuel, such as methanol, formaldehyde, formic acid, carbon monoxide, oxalic acid, etc.

8 Claims, 1 Drawing Figure

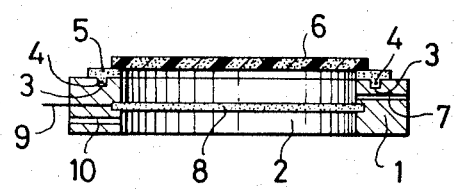

FUEL CELL WITH METAL CHELATE ELECTRODE CATALYST

DETAILS OF THE INVENTION AND SPECIFIC EMBODIMENTS

The invention relates to a catalyst of fuel electrodes for the anodic oxidation of gaseous fuels or fuels which are dissolved in the electrolyte for use in electrochemical fuel cells.

Broad use of fuel cells presupposes the existence of highly active and inexpensive catalysts for the anodic oxidation of economically useful, that is, inexpensive, fuels such as methanol, formaldehyde, formic acid, carbon monoxide, oxalic acid and others. It is of particular interest in this connection to avoid the use of noble metals as catalysts, since the noble metals are of limited availability and high cost and are an obstacle to the broad use of the catalysts.

For alkaline electrolytes Raney-nickel electrodes have been used to form high-performance electrodes which are free of noble metals. However, the alkaline electrolytes have the disadvantage that they absorb carbon dioxide from carbon-containing fuels, which causes using up of the electrolyte. Attempts are therefore more and more being made to employ acidic electrolytes for the fuel cells, because they permit the formed carbon dioxide to escape in gaseous form. For this purpose, however, Raney-nickel electrodes cannot be used.

Catalysts heretofore used for fuel electrodes in fuel cells operating with an acidic electrolyte have been carbides, nitrides, silicides or borides of transition metals, since these materials have a high corrosion-resistance in an acidic medium. The past research has particularly been concentrated on tungsten carbide, since this material may be expected to perform with the highest catalytic activity.

It is accordingly an object of the present invention to provide for a catalyst for fuel electrodes wherein the catalyst is an organic chemical compound and has an adequate activity with respect to relatively inexpensive fuels.

SUMMARY OF THE INVENTION

This objective is solved by a catalyst which comprises a metal chelate of 5,14-dihydro-dibenzo (5,9,14,18)tetraaza(14)-annulene or an electrochemical oxidation product thereof.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The Single Drawing, merely for illustration, shows a cross section through a fuel cell with an electrode in which the catalyst of the invention could be used.

DESCRIPTION OF THE PREFERRED EMBODIMENTS

The preferred chelates of the above compounds are those where cobalt, iron or copper form the central atom. These chelates will be identified in the following as CoTAA, FeTAA or CuTAA of Co-, Fe- or Cu- tetraazaannulene.

The making of these chelates is described in H. Hiller, P. Dimroth and H. Pfitzner in Liebigs Ann. Chem. 717 (1968) 137–147. It is therefore sufficient to state at this point that they can be obtained from o-phenylenediamine, propargylaldehyde and the corresponding metal (II)-acetates, and that they have the following structural formula

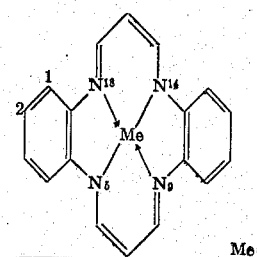

Me=Co, Fe, Cu, (Ni)

The electrodes as such are well known. The catalyst is for instance intimately mixed with a conductive material such as carbon black or activated carbon. It can then be placed between two disks such as graphite disks or a suspension is formed of the mixture, for instance in a polymethacrylic acid ester which is dissolved in an organic solvent. The suspension may then be applied to a carrier disk such as a titanium-palladium disk. The fuel cell itself is likewise of conventional structure.

With reference to the drawing which is furnished only to show the environment of the invention, since other types of electrodes may be used, it will be seen that 8 indicates the electrode which includes the catalyst of the invention.

Reference numeral 7 designates the inlet for fuel and electrolyte, reference numeral 9 the current take-off of the electrode 8, and reference numeral 10 the outlet for fuel and electrolyte.

The electrode holder, which may be a frame, a housing portion or the like, is identified with reference numeral 1 and is provided with an aperture 2 connecting the gas space with the electrolyte space in known manner. The electrode holder 1 is provided on the side at which the other electrode member 6 is to be secured with an annular groove 3 surrounding the opening 2. An elongated conductor 4 is received in the groove 3 and an electrically conducting substance 5 is coated on the holder 1. The electrode member 6 may be a porous sintered-plastic material electrode but could also be a differently constructed electrode. If it is of porous sintered-plastic material, suitable substances include polytetrafluorethylene (PTFE), polyvinylchloride (PVC) and silicone rubber. This type of electrode is further described in U.S. Pat. No. 3,650,840.

The following example will further illustrate the invention:

EXAMPLE 1

1 mg of CoTAA was triturated with four times the amount of an acetylene black in a mortar and the mixture was then placed between two graphite felt disks of a thickness of about 2 mm. The thus-formed electrode was clamped in a plexiglas holder with a current discharge formed of a titaniumpalladium alloy.

The electrocatalytic activity measurement was carried out in the conventional half-cell arrangement by means of a potentiodynamic triangular voltage method. The potential of the electrode to be tested was subjected to linear variation by increasing and decreasing it between 0 and 800 mV relative to a hydrogen electrode used in the same type of electrolyte.

The electrolyte principally was $2n-H_2SO_4$, and in a few cases also $2n-KOH$.

The measurements were carried out at 70°C by first registering the zero curve under nitrogen and only thereafter adding the fuel in a concentration of 1 mol per liter. The fuels, in so far as gaseous, then bubbled through the electrode. With the comparatively low voltage rate of 20 mV/min, the anodically measured currents corresponded directly to the catalytic activity of the catalyst.

The measurements obtained appear from the following table:

Table

Activity of CoTAA for the anodic oxidation of different fuels at 70°C

| Electrolyte | Fuel (1 mol/l) | Activity at 500 mV (mA/mg of catalyst) |
|---|---|---|
| $2n-H_2SO_4$ | HCHO | 0.2 |
| do. | HCOOH | 11.0 |
| do. | $(COOH)_2$ | 10.5 |
| do. | CO | 0.15 |
| do. | $N_2N_4 \cdot H_2O$ | 7.5 |
| $2n-KOH$ | HCOOH | — |
| do. | CO | 0.7 |

It is advantageous to place the electrode provided with the catalyst for a period of time at a potential above 500 mV prior to operation. Presumably, this causes the catalyst to become oxidized electrochemically.

The properties of the electrodes during an extended period of time are highly desirable:
After an initial somewhat pronounced decrease of the activity, it was found that subsequently the activity remained practically constant or was subject to only an insignificant further decrease.

FeTAA and CuTAA also show an activity for the anodic oxidation of formic acid and formaldehyde under the same conditions, although this activity is below that of CoTAA.

EXAMPLE 2

100 mg of activated carbon and 11 mg of CoTAA were stirred into 2 ml of a solution of polymethacrylic acid methyl ester in trichloroethylene employed in a volume ratio of 1:35.

This paste was then applied to a titanium-palladium disk of an area of 2 $cm^2$ in an amount to obtain a deposit of 0.8 mg CoTAA/$cm^2$. The disk had been subjected to a preceding roughening by sand blast. The electrode thus formed, when used with an electrolyte of $2n-H_2SO_4+1m-HCOOH$ at a temperature of 70°C showed an activity at 500 mV of 4.5 mA/$cm^2$. At 350 mV the activity was 1.6 mA/$cm^2$.

EXAMPLE 3

A paste was formed from isobutanol and 0.117 g of a mixture of 46.5 percent by weight of CoTAA, 31 percent by weight of acetylene black, 14.7 percent by weight of polyethylene powder and 7.8 percent by weight of polytetrafluoroethylene powder. The paste was then incorporated by rollers in a netting of fine mesh size consisting of an acid-resistant steel. There was thus obtained an electrode having an active surface of 8 $cm^2$ which thereafter was sintered between two glass plates upon application of slight pressure. The sintering time was one hour and the temperature was 120°C. After a short dip in methanol for improvement of the wetting properties the electrode was activated by applying to it a potential of 750 mV at 50°C in $2n-H_2SO_4$. The potential was maintained until the released charge corresponded to a transfer of two to three electrodes.

The thus formed activated electrode furnished a current of 240 mA at a potential of 350 mV at 70°C in $2nH_2SO_4+3$ mole of HCOOH. This corresponded to a current density of 30 mA/$cm^2$, that is, an activity of the catalyst of 4.4 mA per mg CoTAA.

If a fine mesh gold netting with substantially higher electrical conductivity was used in the place of the netting of acid-resistant steel, a current density of 40 mA/$cm^2$ was obtained under otherwise identical conditions with a layer of 7.5 mg CoTAA per $cm^2$. The catalyst activity in this case was 5,3 mA/mg.

The catalyst of the invention permits obtaining a fuel electrode for fuel cells which have a rather high activity for the anodic oxidation of formic acid, oxalic acid, hydrazine, formaldehyde and carbon monoxide. The values obtained are partly higher than those of platinum. The stability of the catalyst was found to be good during long-term testing.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by letters Patent is set forth in the appended claims:

1. In a fuel cell, particularly wherein a fuel dissolved in the electrolyte of the cell or a gaseous fuel is subjected to anodic oxidation, an electrolyte; and a fuel cell electrode comprising a catalyst which includes a substance selected from the group consisting of metal chelates of 5, 14-dihydro-dibenzo (5,9,14,18) tetraaza(14)—annulene.

2. In a fuel cell as defined in claim 1, wherein said metal chelates comprise cobalt as the central atom.

3. In a fuel cell as defined in claim 1, wherein said metal chelates comprise iron as the central atom.

4. In a fuel cell as defined in claim 1, wherein said metal chelates comprise copper as the central atom.

5. In a fuel cell as defined in claim 1, wherein said electrolyte is an acidic electrolyte.

6. In a fuel cell as defined in claim 5, wherein said electrolyte comprises sulfuric acid.

7. In a fuel cell as defined in claim 1, wherein the fuel includes a substance selected from the group consisting of formaldehyde, formic acid, oxalic acid, carbon monoxide and hydrazine hydrate.

8. In a fuel cell as defined in claim 1, wherein the fuel includes a substance selected from the group consisting of formic acid and carbon monoxide, and said electrolyte comprises potassium hydroxide.

* * * * *